United States Patent
Hopkins et al.

(10) Patent No.: US 7,068,427 B2
(45) Date of Patent: Jun. 27, 2006

(54) PROJECTION SCREENS, METHODS FOR FORMING A PROJECTION SCREEN AND PROJECTION SCREEN KITS

(75) Inventors: John T. Hopkins, West Chester, OH (US); Richard S. Burrows, Milford, OH (US)

(73) Assignee: DIY Theatre, LLC, West Chester, OH (US)

( * ) Notice: Subject to any disclaimer, the term of this patent is extended or adjusted under 35 U.S.C. 154(b) by 144 days.

(21) Appl. No.: 10/654,115

(22) Filed: Sep. 3, 2003

(65) Prior Publication Data

US 2005/0046938 A1 Mar. 3, 2005

(51) Int. Cl.
*G03B 21/56* (2006.01)
*G03B 21/60* (2006.01)

(52) U.S. Cl. ...................... 359/443; 359/452

(58) Field of Classification Search ................ 359/450, 359/452, 454, 455, 459, 443
See application file for complete search history.

(56) References Cited

U.S. PATENT DOCUMENTS

| | | | | |
|---|---|---|---|---|
| 2,579,892 A | * | 12/1951 | Wright | ........................ 428/119 |
| 2,944,462 A | * | 7/1960 | Harkness | ..................... 359/452 |
| 4,062,286 A | * | 12/1977 | Ford | ............................ 101/375 |
| 5,260,358 A | * | 11/1993 | Shimizu et al. | ................ 524/31 |
| 5,571,624 A | * | 11/1996 | Phillips et al. | .............. 428/403 |
| 5,968,271 A | * | 10/1999 | Maxwell et al. | ............ 118/671 |
| 6,266,186 B1 | * | 7/2001 | Greiner | ...................... 359/466 |
| 6,348,235 B1 | * | 2/2002 | Cavill et al. | ................. 427/280 |
| 6,700,112 B1 | * | 3/2004 | Brown | ......................... 250/216 |
| 2003/0002152 A1 | * | 1/2003 | Atchison et al. | ............ 359/449 |
| 2004/0077497 A1 | * | 4/2004 | Korane et al. | .............. 503/201 |

OTHER PUBLICATIONS http://www.goosystems.com/goosystems.cgi/index (accessed Jan. 23, 2003).

* cited by examiner

*Primary Examiner*—W. B. Perkey
*Assistant Examiner*—Andrew Sever
(74) *Attorney, Agent, or Firm*—Dinsmore & Shohl LLP (57) ABSTRACT

A projection screen is formed of at least one screen layer comprising a non-interference pigment. Methods for forming a projection screen comprise the steps of: applying a primer composition onto the substrate to form a primer layer and applying a screen composition onto the primer layer to form a screen layer. Projection screen kits comprise an individually packaged base composition and an individually packaged reflective additive composition.

16 Claims, 4 Drawing Sheets

PROJECTION SCREENS, METHODS FOR FORMING A PROJECTION SCREEN AND PROJECTION SCREEN KITS

FIELD OF THE INVENTION

The present invention is directed towards projection screens, methods for forming a projection screen and projection screen kits. The projection screens, methods and kits allow for customization of screen size, format, contrast, gain and the like.

BACKGROUND OF THE INVENTION

A consumer's selection of projection screens has been severely limited to the specifications of manufacturers. Conventional projection screens are prefabricated to provide a specific gain as well as to be of specific dimensions. Consumers are thus required to conform their needs to accommodate a manufacturer's production line. Custom sizes, if available, require the lead-time of a special order and make to order increased charges. Once a consumer chooses a projection screen, the consumer still must undertake the onerous task of electrical and hardware installation of the projection screen. Finally, even when installation of the projection screen is successful, a consumer may still have problems with the projection screen. Some of these problems include, but are not limited to, inoptimal gain based on ambient lighting, projection lighting, or the like, visible black markings on flexible projection screens which result from the rolling of the screen during storage, shipping and/or non-use, seams in the screen material required during manufacture, shrinkage of the projection screen under conditions of varying temperature and/or humidity, often causing waves or wrinkles, and/or tackiness on the surface of the projection screen, attracting dust, dirt or other contaminants which disadvantageously effect the projection surface.

Thus, there is a substantial need for projection screens which may be designed by a consumer to accommodate specific requirements for gain as well as projection screen dimensions. Moreover, it would be desirable to obtain projections screens which do not require electrical and/or hardware installation of the projection screen. Additionally, it would be advantageous to obtain projection screens which eliminate many of the problems associated with conventional projection screens, such as visible black markings, shrinkage, seams, and/or tackiness.

SUMMARY OF INVENTION

Accordingly; it is an object of the invention to provide novel projection screens which overcome disadvantages of conventional projection screens. It is an additional object of the invention to provide projection screens which may be customized by a consumer to have desired projection screen dimensions and gain. It is another object of the invention to provide methods for forming a projection screen. It is a further object of the invention to provide projection screen kits.

In accordance with one aspect of the invention, there are provided projection screens formed of at least one screen layer. The screen layer comprises a non-interference pigment.

In accordance with another aspect of the invention, there are provided methods for forming a projection screen. The methods comprise the steps of applying a primer composition onto a substrate to form a primer layer and applying a screen composition onto the primer layer to form a screen layer. The screen composition comprises a sufficient amount of a reflective additive composition to provide a predetermined gain to the projection screen.

In accordance with yet another aspect of the invention, there are provided projection screen kits. The kits comprise an individually packaged base composition and an individually packaged reflective additive composition.

In accordance with yet another aspect of the invention, there are provided additional projection screen kits. The projection screen kits comprise (a) an individually packaged primer composition; (b) an individually packaged base composition; (c) an individually packaged reflective additive composition; (d) at least one roller cover; and (e) instructions directing a consumer to add an effective amount of the reflective additive composition to the base composition to provide a predetermined gain for an applied projection screen.

The present projection screens, methods for forming a projection screen and projection screen kits are advantageous to enable a consumer to design a projection screen to specifically accommodate their projection screen gain and dimension needs. The present projection screens, methods and kits are also advantageous for providing high quality projection screen products. Additional embodiments, objects and advantages of the invention will become more fully apparent in view of the following detailed description.

BRIEF DESCRIPTION OF THE DRAWINGS:

The following detailed description will be more fully understood in view of the drawings, in which.

DETAILED DESCRIPTION

Figure 1:
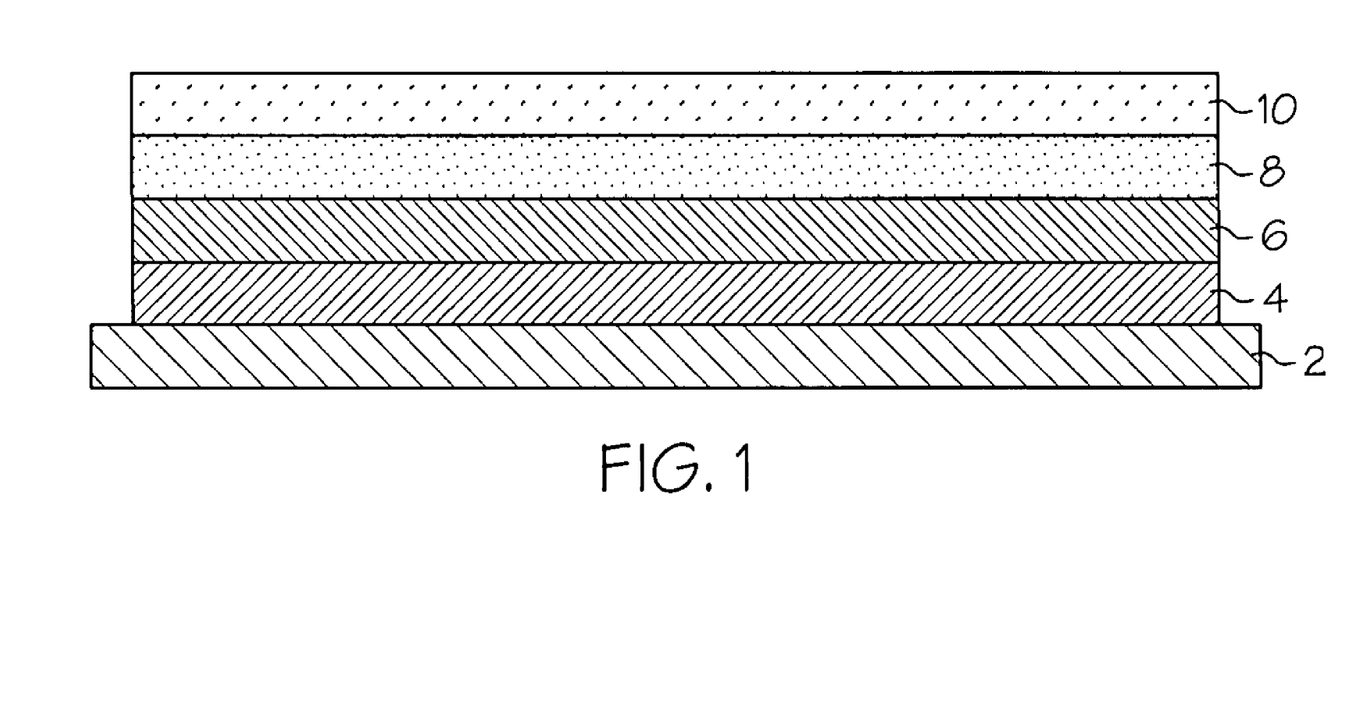
FIG. 1 is a schematic illustration of an embodiment of a projection screen comprising a substrate (2); a first primer layer (4); a second primer layer (6); a first screen layer (8) and a second screen layer (10)
Figure 2:
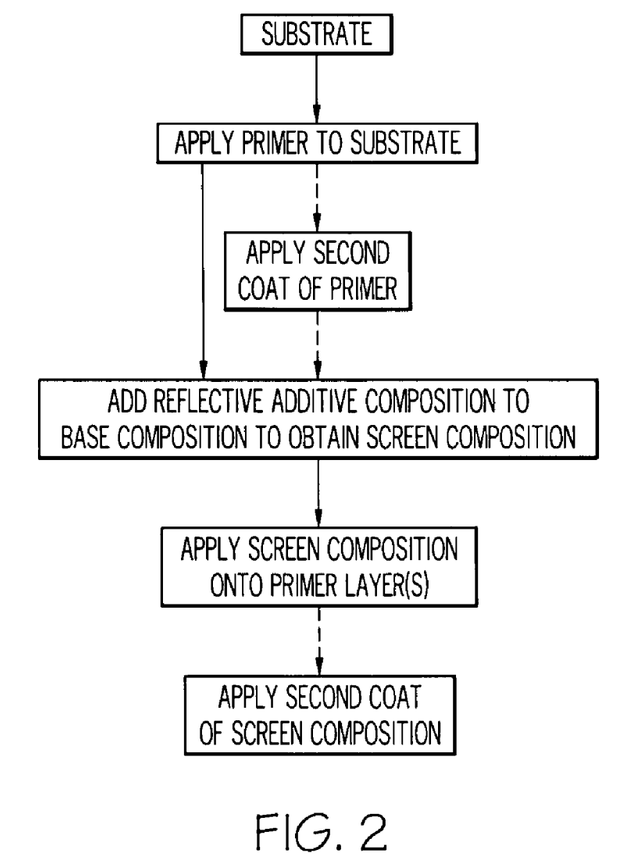
FIG. 2 is a flowchart representing an embodiment of a method for forming a projection screen.
Figure 3:
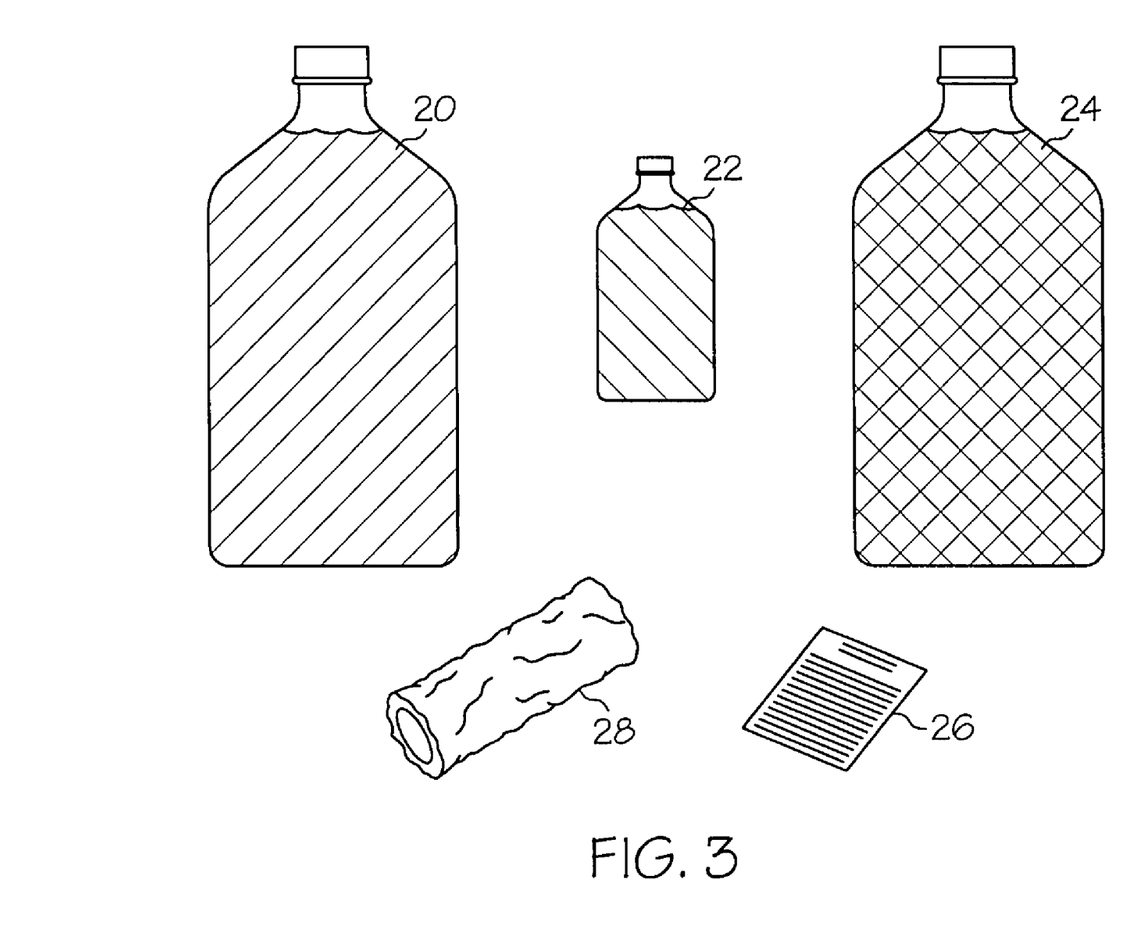
FIG. 3 is an illustration of an embodiment of the various components of a projection screen kit comprising an individually packaged primer composition (20); an individually packaged reflective additive composition (22); an individually packaged base composition (24); a roller cover (28); and instructions (26)
Figure 4:
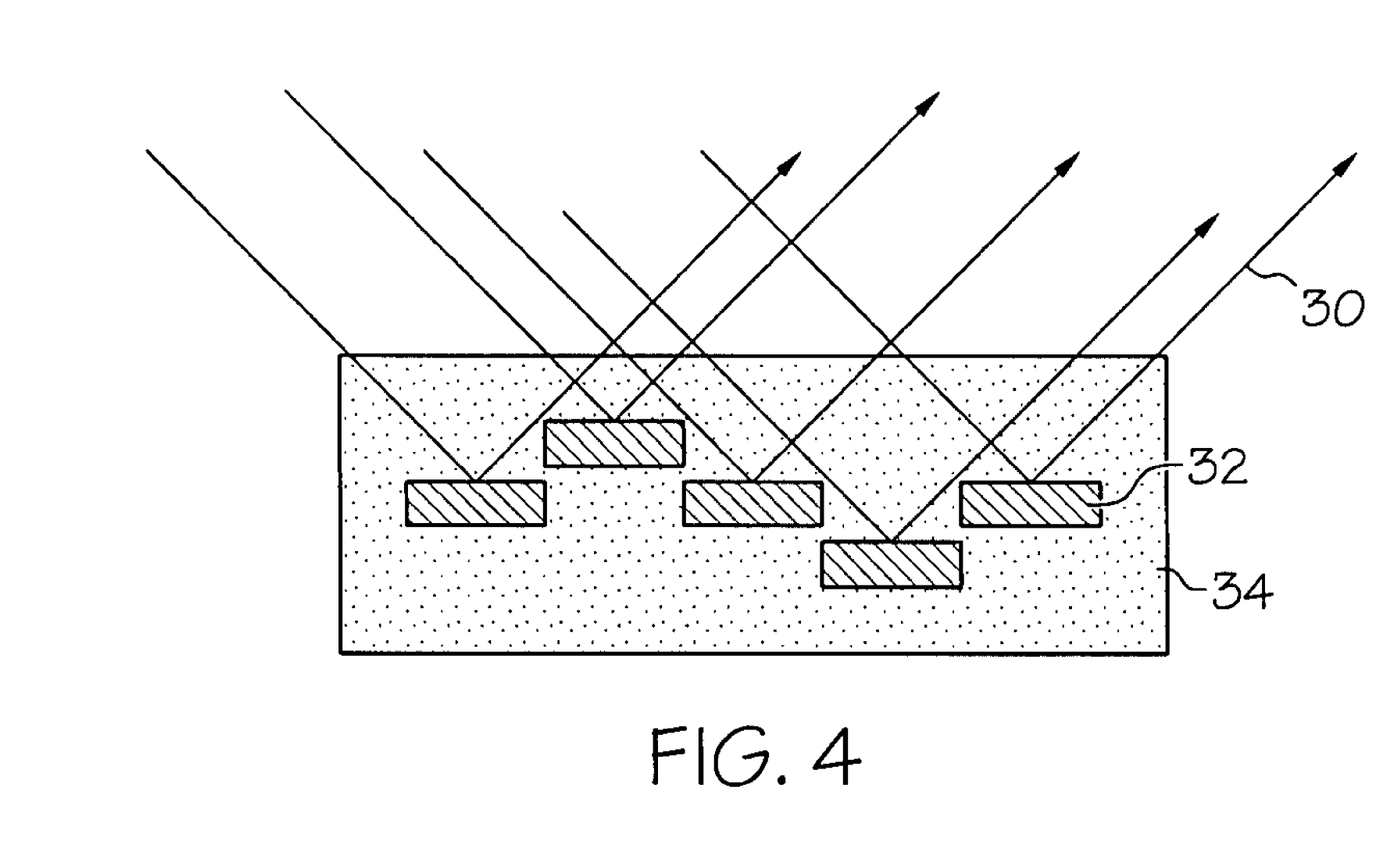
FIG. 4 is an illustration of the mechanism of a non-interference pigment; light rays (30) strike the non-interference pigment (32) comprised within the screen composition (34) and the light rays are directed back in a single reflection.

The present invention is directed to projection screens, methods for forming a projection screen and projection screen kits. Advantageously, the projection screens, methods for forming a projection screen and projection screen kits of the present invention enable a consumer to create their own projection screen to specifically accommodate their particular projection screen requirements.

In one embodiment, the projection screens of the present invention are formed of at least one screen layer which comprises a non-interference pigment. The projection screen may, in specific embodiments, comprise two or more layers. Layers in addition to the at least one screen layer may comprise additional screen layers, with or without non-interference pigment, or alternatively, or in addition, non-screen layers as will be discussed in further detail below. In this embodiment, the screen layer comprises a non-interference pigment. As used herein, the term "non-interference pigment" is intended to refer to a pigment which reflects impinging light with no separation (interference) of the resultant light ray, thus providing a reflection with no available, any of which may be employed herein. Examples of non-interference pigments include, but are not limited to titanium dioxide, opaque pigments coated with a metal oxide such as titanium dioxide, iron oxide, chromium pigments, vanadium pigments, mixtures thereof, and the like. In a specific embodiment, the non-interference pigment comprises aluminum oxide ($Al_2O_3$) coated with titanium dioxide. Other metal oxides and/or mixed metal oxides, typically transition metals, for example iron (III) oxide, Sn (II) oxide, or other metal oxides, in addition to titanium dioxide, may be employed as coatings for an opaque pigment. The pigment may be of a size suitable for desired reflective properties. In one embodiment, the pigment has a fine grain size, for example ranging from about 1 to about 500 μm, although other sized particles may also be employed. In a more specific embodiment, the non-interference pigments have a fine grain size which ranges from about 5 to about 30 μm.

The screen layer may optionally include a resin matrix for the non-interference pigment. The resin may be non-cross-linking or self-cross-linking or may include a cross-linking agent or may include a pre-polymerized solvent soluble resin. In one embodiment, the screen layer comprises a self cross-linking acrylic resin. The cross-linking may be a result of urethane, epoxy, alkyd or polyesters linkages or a combination of these, although other crosslinking mechanisms may be employed if desired. One skilled in the art will appreciate various other resins may be employed herein. The resin matrix typically is employed in an amount sufficient to provide continuity between pigment particles. In one embodiment, the resin matrix is contained in the screen layer in an amount of from about 50 to about 99 weight percent, more specifically from about 60 to about 90 weight percent.

The one screen layer comprising a non-interference pigment may further comprise additional components. One skilled in the art will appreciate the various components to include in the screen layer, any of which may be employed herein. Examples of such components include, but are not limited to, one or more of flow additives, leveling additives antimicrobial agents, perfumes, thickening agents, optical brighteners, phosphorescent pigments, fluorescent pigments, non crystalline silica, bitter additives, water, fillers, including diatomaceous earth, clay, talc, silica, quartz, aluminum trihydrate, ground glass, glass beads, glass microspheres, ceramic microspheres, barium sulfate, calcium carbonate and/or magnesium carbonate, and combinations thereof. In an embodiment, a solvent such as propylene glycol is added in order to keep the surface of the drying film open, which allows maximum leveling time. Various amounts of fillers may be included in the screen layer. In one embodiment, the screen layer Comprises from about 0.1 to about 20 weight percent of such fillers.

The non-interference pigment is included in the screen layer in amount sufficient to provide a predetermined gain to the projection screen. As used herein, "gain" is defined as a ratio of two light measurements, which is the perceived brightness of the screen. Gain is obtained by measuring the amount of reflected light from a pure white substrate and then from a screen surface using the same projected light source and identical area light conditions. In one embodiment, the predetermined gain of the projection screen may range from about 0.6 to about 2.5, with a larger amount of the non-interference pigment being employed to obtain a gain in the higher portion of the range. Although the amount of a pigment necessary to provide a particular gain will depend on the type and concentration of pigment therein, in a specific embodiment, the screen layer comprises from about 0.01 to about 10 weight percent of the non-interference pigment. In a more specific embodiment, the screen layer comprises from about 0.1 to about 7.5 weight percent of the non-interference pigment. In yet another embodiment, the screen layer comprises from about 0.1 to about 6.0 weight percent of the non-interference pigment.

In one embodiment, the screen layer comprising a non-interference pigment is formed on a substrate. One skilled in the art will appreciate the various substrates on which a projection screen may be formed, any of which may be employed herein. Substrates include, but are not limited to, glass, acrylic sheet, plastic, wood, metal, fabric, fiberglass, cement, drywall, plaster or a combination thereof. The projection screens may be easily formed or installed on any such substrate, as will be described in further detail below.

As the projection screen comprises at least one layer, the projection screen may further comprise additional layers. In one embodiment, the projection screen also comprises a primer layer. The primer may be used to improve the surface on which the screen layer is formed. For example, the primer layer may be provided to smooth surface irregularities, improve surface adhesion, and/or otherwise contribute to improvement of the projection screen product. In another embodiment, the primer layer of the projection screen is provided between a substrate and the screen layer containing the non-interference pigment. One skilled in the art will appreciate the various compositions which may be used to form the primer layer of the projection screen, any of which may be employed herein. In one embodiment, the primer layer may comprise an interior or exterior paint primer, which may be either oil or water based paint primer. Exemplary primer compositions range from no contrast primer to high contrast primers. Examples of such formulations for varying primer contrast are set forth in Examples 1–4. Furthermore, one skilled in the art will appreciate that the various primer compositions may be used interchangeably with the screen layer which provides a predetermined gain lo the projection screen in the range from about 0.6 to about 2.5.

The present invention is also directed to methods for forming a projection screen. The methods comprise the steps of: applying a primer composition onto a substrate to form a primer layer; and applying a screen composition onto the primer layer to form a screen layer. The screen composition comprises a sufficient amount of a reflective additive composition to provide a predetermined gain to the projection screen.

The primer composition is applied onto a substrate to form a primer layer. As discussed in detail above, one skilled in the art will appreciate the various compositions which may be used to form the primer layer of the projection screen, any of which may be employed herein. In addition, as discussed in detail above, one skilled in the art will appreciate the various substrates to which the primer layer may be applied, any of which may be employed herein.

The primer layer may be applied to the substrate by any means known to one skilled in the art. Methods for applying the primer layer to the substrate include, but are not limited to, brushing, painting, spraying, roll-coating, or a combination thereof. In a specific embodiment, the primer layer is applied using a conventional paint roller. In another embodiment, the method further comprises shaking, stirring and/or mixing the primer composition prior to applying the primer composition to the substrate to obtain a homogenous application of the primer composition.

Once the primer layer has been applied to the substrate, the method may further comprise drying the primer layer. One skilled in the art will appreciate the various methods for drying the primer layer, any of which may be employed herein. In one embodiment, the primer layer is air-dried. After the primer layer is dried, the method may further comprise applying a second coat of the primer composition onto the primer layer. However, in many instances, a single primer layer is employed.

After the primer layer is applied to the substrate, a screen composition is applied onto the primer layer to form the screen layer. The screen composition comprises a sufficient amount of reflective additive comprising a reflective pigment to provide a predetermined gain to the projection screen. In one embodiment, the reflective additive comprises one or more non-interference pigments as described above. In a specific embodiment, the non-interference pigment comprises aluminum oxide coated with titanium dioxide. In addition, or alternatively, the reflective additive composition may comprise other types of reflective pigments, for example, interfering pearlescent pigments, aluminum flakes, or the like.

The screen composition comprises a sufficient amount of the reflective additive to provide a predetermined gain to the projection screen. As discussed in further detail above, gain is a ratio of two light measurements. Accordingly, one skilled in the art will be able to easily determine the amount of a reflective additive composition which is sufficient to provide a predetermined gain to the projection screen. Thus, in one embodiment, depending upon the amount of reflective additive composition, the predetermined gain of the screen composition may be from about 0.6 to about 2.5. Although the amount of the reflective additive necessary to provide a particular gain will depend on the type and concentration of reflective additive therein, in a specific embodiment, a screen composition suitable for application to provide a screen layer comprises from about 0.005 to about 3.0 weight percent of reflective additive therein. In another embodiment, a screen composition comprises from about 0.01 to about 2.0 weight percent of reflective additive therein.

In yet another embodiment, the method comprises adding a separately packaged reflective additive composition to a base composition to form the screen composition. A sufficient amount of a reflective additive composition is added to form the screen composition with a predetermined gain. The base composition provides a suitable matrix for the screen layer. In one embodiment, the base composition comprises a cross-linkable resin. The resin may be self-crosslinking or may include a cross-linking agent. In one embodiment, the base composition comprises a self cross-linking acrylic resin. The cross-linking may be a result of urethane linkages, epoxies, alkyd, polyesters or a combination of these. One skilled in the art will appreciate the various other resins which may be included in the base composition of the present invention, any of which may be employed herein. The base composition may comprise one or more of resins, flow additives, leveling additives, ceramic spheres, antimicrobial agents, bitter additives, phosphorescent pigments, fluorescent pigments, optical brighteners, perfumes, solvents, thickeners, modifiers, water and fillers.

The reflective additive composition may comprise various types of reflective additives, for example, non-interference pigments, interference pigments, aluminum flakes, or the like. In a specific embodiment, the reflective additive comprises non-interference pigment comprising $Al_2O_3$ coated with titanium dioxide or interference pigment comprising mica coated with titanium dioxide.

Additionally, one skilled in the art will appreciate various additional components which may be included in the reflective additive composition, any of which maybe employed herein. In one embodiment, the reflective additive composition further comprise:: one or more matrix resins, flow additives, leveling additives, anti-microbial agent::, perfumes, thickening agents, bitter additives, vehicle, for example, water, solvent, for example, propylene glycol, or a mixture thereof, optical brightener pigments, phosphorescent pigments, fluorescent pigments, ceramic beads, and fillers or combinations thereof.

In one embodiment, the reflective additive composition comprises from about 1.0 to about 75 weight percent of the reflective pigment. In a more specific embodiment, the reflective additive composition comprises from about 0.1 to about 15 weight percent of the reflective pigment, for example when the composition is a solution, dispersion or emulsion form.

One skilled in the art will appreciate the various liquid vehicles which may be optionally employed for the reflective additive composition, base composition, and resulting screen composition, any of which may be used herein. Examples of vehicles include, but are not limited to, water, organic solvents, including oils and/or resins, and mixtures thereof. In one embodiment, the reflective additive composition, base composition, and resulting screen composition are aqueous solutions, dispersions or emulsions. In another embodiment, the base composition and resulting screen composition are aqueous dispersions or solutions and the reflective additive composition is in a particle form, without a liquid vehicle.

The screen composition is applied to the primer layer. One skilled in the art will appreciate the various methods for applying the screen composition onto the primer layer, any of which may be employed herein. Examples of methods for applying the screen composition onto the primer layer include, but are not limited to, brushing, painting, spraying, roll-coating, or a combination thereof. In a specific embodiment, the screen composition is applied using a conventional paint roller. In another embodiment, the method may further comprise shaking, stirring and/or mixing the screen composition prior to applying the screen composition onto the primer layer to obtain a homogenous application of the screen composition.

Once the screen composition has been applied to the primer layer, the method may further comprise drying the applied screen composition. One skilled in the art will appreciate the various methods for drying the applied screen composition, any of which may be employed herein. In one embodiment, the applied screen composition is air dried. After the applied screen composition is dried, the method may optionally further comprise applying a second layer of the screen composition onto the first layer of the screen composition.

After the projection screen has been formed by applying the primer composition(s) and the screen composition(s), the methods for forming a projection screen may further optionally comprise applying an edge around the screen layer perimeter. One skilled in the art will appreciate the various materials which may be used as an edge, any of which may be employed herein. Materials for an edge include, but are not limited to, tape, curtains, wood or a combination thereof. Furthermore, as the dimensions of the projection screen may be dependent upon the desired specifications of the consumer, the method may further comprise determining the dimensions of the projection screen on the substrate prior to applying the primer composition onto the substrate. One skilled in the art will appreciate the various methods for determining the dimensions of the projection screen on the substrate, any of which may be employed herein. In one embodiment, the method comprises directing a projector light onto the substrate and sketching the resulting light pattern onto the substrate.

The present invention is also directed to projection screen kits. The projection screen kit comprises an individually packaged base composition and an individually packaged reflective additive composition. Base and reflective additive compositions as discussed above may be employed.

Moreover, one skilled in the art will appreciate the various containers for individually packaging the compositions, any of which may be employed herein. Examples of packages include, but are not limited to, cartons, shipping containers, bags or other articles of manufacture.

In one embodiment, the reflective additive composition is adapted to provide, upon addition to the base composition, a screen composition adapted to exhibit a predetermined gain when applied on a primed substrate. Thus, in one embodiment, the projection screen kit may further comprise instructions directing a consumer to add an effective amount of the reflective additive composition to the base composition to provide a predetermined gain for an applied projection screen. In one embodiment, so that a customized gain may be obtained, the instructions will indicate varied amounts of the reflective additive composition which will be sufficient to provide respective gains. One skilled in the art will appreciate the various formats for providing instructions, any of which may be employed herein. In one embodiment, the instructions are in an audio format, an audiovisual format, i.e., video or compact disc, icons or other illustrations, text format, i.e., written instructions, or a combination thereof.

In another embodiment of the present invention, the projection screen kit may further comprise an individually packaged primer composition. In yet another embodiment of the present invention, the projection screen kit may further comprise at least one roller cover adapted to fit conventional paint roller devices. The projection screen kits may optionally include outer packaging, i.e., box, wrapper, shrink wrap, or bag or the like, for collectively providing the kit components to a consumer.

In a specific embodiment of the present invention, a projection screen kit comprises (a) an individually packaged primer composition; (b) an individually packaged base composition; (c) an individually packaged reflective additive composition; (d) at least one roller cover; and (e) instructions directing a consumer to apply an effective amount of the reflective additive composition to the base composition to provide a predetermined gain for an applied projection screen.

EXAMPLES

The following examples demonstrate various embodiments of the invention. In the examples, and throughout this specification, parts and percentages are by weight unless otherwise specified.

Example 1

This example demonstrates a method for forming a projection screen on a surface, i.e., a wall, formed of drywall. Before application of the various compositions to the drywall substrate, the dimensions of the projection screen are determined by shining a projection screen light onto the substrate and marking the substrate with the exact dimensions of the projection screen light. The dimension of the projection screen is predetermined to be 120" diagonal.

A light contrast primer composition comprising 99.280% white primer, 0.3860% perfume, 0.0390% flow additive, 0.2600% bitter additive and 0.035% black pigment is sufficiently stirred. The stirred primer composition is applied onto the drywall substrate by roll-coating and is air dried to form the first primer layer. A second coat of the primer composition is applied onto the first primer layer by roll-coating and air-drying.

A sufficient amount of a reflective additive composition is added to a base composition to thereby form a screen composition with a predetermined gain. The base composition comprises: 83.50% acrylic resin, 0.815% flow and leveling additives, 1.595% phosphorescent component, 0.8550% fluorescent component, 1.145% thickener-rheology adjuster, 0.6300% submicron ceramic spheres, 1.380% perfume, 0.23% antimicrobial, 0.3000% bitter additive, 4.55% water and 5.000% co-solvent. The reflective additive composition comprises: 1.200% flow and leveling additives, 10.750% co-solvent, 0.300% antimicrobial additives, 4.000% perfume, 1.675% thickeners, 6.500% non-interference pigment, 0.300% bitter additive and 75.275% water. Five fluid ounces of the reflective additive composition is added to 45.76 fluid ounces liter of the base composition to achieve a predetermined gain of 1.5.

The screen composition is thoroughly stirred and applied onto the top primer layer by roll-coating to form the screen layer. The screen layer is air-dried and then a second coating of the screen composition is applied by roll-coating. Once the second screen layer has thoroughly air-dried, a black edging is applied around the screen layer perimeter.

Example 2

This example demonstrates a method for forming a projection screen on a cement substrate. A no contrast primer composition comprising 99.3550% white primer, 0.2583% bitter additive and 0.3867% perfume is sufficiently stirred. The stirred primer composition is applied onto a cement substrate by painting and is dried to form a first primer layer. A second coat of the primer composition is applied onto the first primer layer by painting and is dried to form the second primer layer.

A sufficient amount of a reflective additive composition is added to a base composition, to thereby form a screen composition with a predetermined gain. The base composition comprises: 83.50% acrylic resin, 0.815% flow and leveling additives, 1.595% phosphorescent component, 0.8550% fluorescent component, 1.145% thickener-rheology adjuster, 0.6300% submicron ceramic spheres, 1.380% perfume, 0.23% antimicrobial, 0.3000% bitter additive, 4.55% water and 5.000% co-solvent. The reflective additive composition comprises: 1.200% flow and leveling additives, 10.750% co-solvent, 0.300% antimicrobial additives, 4.000% perfume, 1.675% thickeners, 6.500% non-interference opalescent pigment, 0.300% bitter additive and 75.275% water. Eight fluid ounces of the reflective additive composition is added to 45.76 fluid ounces of the base composition to achieve a predetermined gain of 1.80.

The screen composition is thoroughly mixed and is applied onto the top primer layer by roll-coating to form the screen layer. The screen layer is air-dried and then a second coating of the screen composition is applied by roll-coating. Once the second screen layer has thoroughly air-dried, dark colored curtains are applied around the screen layer perimeter.

Example 3

This example demonstrates a method for forming a projection screen on a sheet acrylic substrate. A medium contrast primer composition comprising 99.238% white primer, 0.386% perfume, 0.037% flow additive, bitter additive 0.260% and 0.079% black pigment is sufficiently shaken. The shaken primer composition is applied onto a sheet acrylic substrate by brushing and is air-dried to form the first primer layer. A second coat of the primer composition is applied onto the first primer layer by brushing and is air-dried.

A sufficient amount of a reflective additive composition is added to a base composition, to thereby form a screen composition with a predetermined gain. The base composition comprises: 83.50% acrylic resin, 0.815% flow and leveling additives, 1.595% phosphorescent component, 0.8550% fluorescent component, 1.145% thickener-rheology adjuster, 0.6300% submicron ceramic spheres, 1.380% perfume, 0.23% antimicrobial, 0.3000% bitter additive, 4.55% water and 5.000% co-solvent. The reflective additive composition comprises: 1.200% flow and leveling additives, 10.750% co-solvent, 0.300% antimicrobial additives, 4.000% perfume, 1.675% thickeners, 6.500% non-interference opalescent pigment, 0.300% bitter additive and 75.275% water. Six fluid ounces of the reflective additive composition is added to 45.76 fluid ounces of the base composition to achieve a predetermined gain of 1.30.

The screen composition is thoroughly mixed and is applied onto the top primer layer by roll-coating to form the screen layer. Once the screen layer has thoroughly air-dried, a dark colored chair rail is applied around the screen layer perimeter.

Example 4

This example demonstrates a method for forming a projection screen on a plaster substrate. A high contrast primer composition comprising 99.166% white primer, 0.3860% perfume, 0.0386% flow additive, bitter additive 0.2604% and 0.149% black pigment is sufficiently stirred. The stirred primer composition is applied onto a plaster substrate by spraying and is dried.

A sufficient amount of a reflective additive composition is added to a base composition, to thereby form a screen composition with a predetermined gain. The base composition comprises: 83.50% acrylic resin, 0.815% flow and leveling additives, 1.595% phosphorescent component, 0.8550% fluorescent component, 1.145% thickener-rheology adjuster, 0.6300% submicron ceramic spheres, 1.380% perfume, 0.23% antimicrobial, 0.3000% bitter additive, 4.55% water and 5.000% co-solvent. The reflective additive composition comprises: 1.200% flow and leveling additives, 10.750% co-solvent, 0.300% antimicrobial additives, 4.000% perfume, 1.675% thickeners, 6.500% non-interference opalescent pigment, 0.300% bitter additive and 75.275% water. One fluid ounce of the reflective additive composition is added to 45.76 fluid ounces of the base composition to achieve a predetermined gain of 0.70.

The screen composition is thoroughly mixed and is applied onto the primer layer by roll-coating to form the screen layer. The screen layer is dried and then a second coating of the screen composition is applied by roll-coating. Once the projection screen has thoroughly dried, flat black tape is applied around the screen layer perimeter to provide masking. The foregoing description of the various embodiments of the invention has been presented for the purpose, of illustration and description. It is not intended to be exhaustive or to limit the invention to the precise form disclosed. Many alternatives, modifications and variations will be apparent to those skilled in the art of the above teaching. Accordingly, this invention is intended to embrace all alternatives, modifications and variations that have been discussed herein, and others that fall within the spirit and broad scope of the claims.

What is claimed is:

1. A projection screen, comprising at least one screen layer including a non-interference pigment, wherein the projection screen has a screen configuration and has a gain of from about 0.6 to about 2.5.

2. A projection screen according to claim 1, wherein the at least one screen layer further comprises one or more flow additive, leveling additive, anti-microbial agent, perfume, thickening agent, optical brightener, phosphorescent pigment, fluorescent pigment, bitter additive, water, ceramic bead, propylene glycol, filler, or combinations thereof.

3. A projection screen according to claim 1, wherein the projection screen is formed on a substrate.

4. A projection screen according to claim 3, further comprising a primer layer between the screen layer and the substrate.

5. A projection screen according to claim 1, wherein the non-interference pigment comprises aluminum oxide coated with titanium dioxide.

6. A method for forming a projection screen, comprising the steps of:
   a. applying a primer composition onto a substrate in a configuration of a projection screen to form a projection screen primer layer; and
   b. applying a screen composition onto the primer layer in the configuration of a projection screen to form a screen layer on the primer layer, wherein the screen composition comprises a non-interference pigment, to form a projection screen having a gain of from about 0.6 to about 2.5.

7. The method according to claim 6, further comprising adding a separately packaged non-interference pigment composition comprising the non-interference pigment to a base composition to form the screen composition prior to applying the screen composition.

8. The method according to claim 7, wherein the non-interference pigment composition further comprises one or more flow additive, leveling additive, anti-microbial agent, perfume, thickening agent, optical brightener, phosphorescent pigment, fluorescent pigment, ceramic bead, propylene glycol, water, co-solvent, bitter additive, filler or combinations thereof.

9. The method according to claim 6, wherein the substrate is glass, sheet acrylic, metal fabric, fiberglass, wood, cement, drywall, plaster, or a combination thereof.

10. The method according to claim 6, wherein the primer composition is applied to the substrate by brushing, painting, spraying, roll-coating or a combination thereof.

11. The method according to claim 6, wherein the screen composition is applied to the primer layer by brushing, painting, spraying, roll-coating or a combination thereof.

12. The method according to claim 6, wherein the non-interference pigment comprises aluminum oxide coated with titanium dioxide.

13. The method according to claim 6, further comprising applying an edge around the applied projection screen, separating the projection screen from a surrounding surface.

14. A projection screen kit comprising an individually packaged base compositions an individually packaged non-interference pigment composition adapted to provide, upon addition to the base composition, a screen composition adapted to exhibit a gain of from about 0.6 to about 2.5 when applied on a substrate, and instructions directing a consumer to add an effective amount of the non-interference pigment composition to the base composition to provide the projection screen composition and directing a consumer to apply the projection screen composition on a substrate in the configuration of a projection screen.

15. The projection screen kit according to claim 14, further comprising an individually packaged primer composition.

16. The projection screen kit according to claim 14, further comprising at least one roller cover.

* * * * *